S. BACHMANN.
BOX.
APPLICATION FILED APR. 26, 1909.
931,373.
Patented Aug. 17, 1909.
3 SHEETS—SHEET 2.
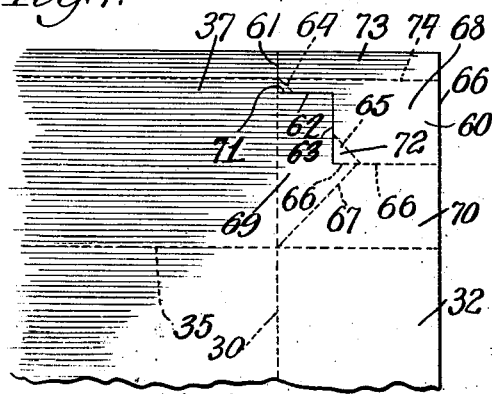
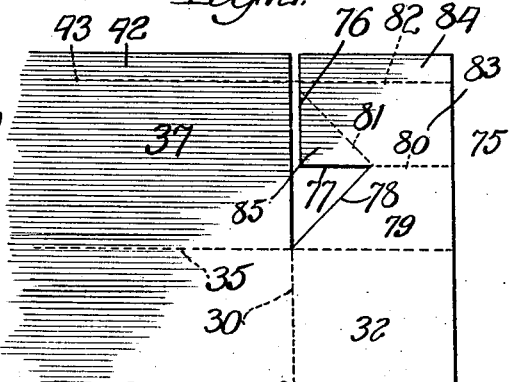
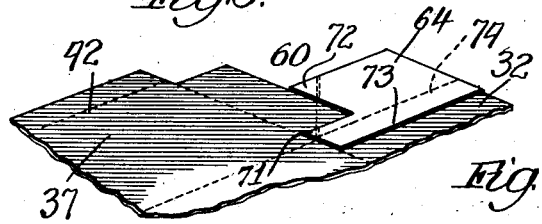
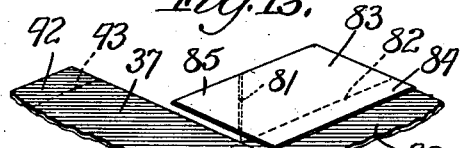
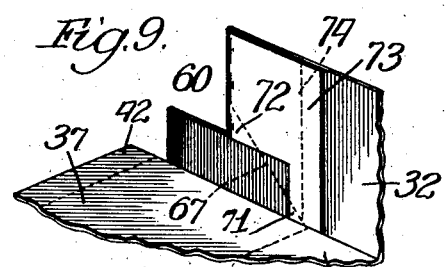
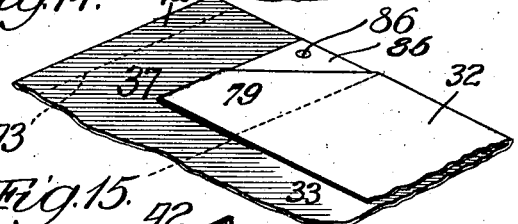
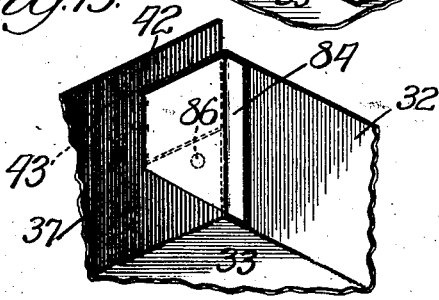
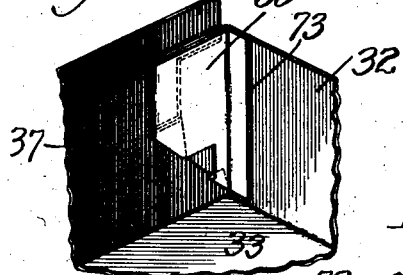
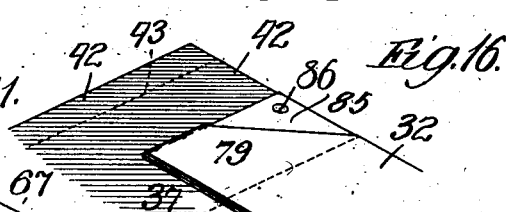
Witnesses:
John Enders
Chas. H. Buell
Inventor:
Siegmund Bachmann,
By Dyrenforth, Lee, Chritton & Wiles,
Attys.

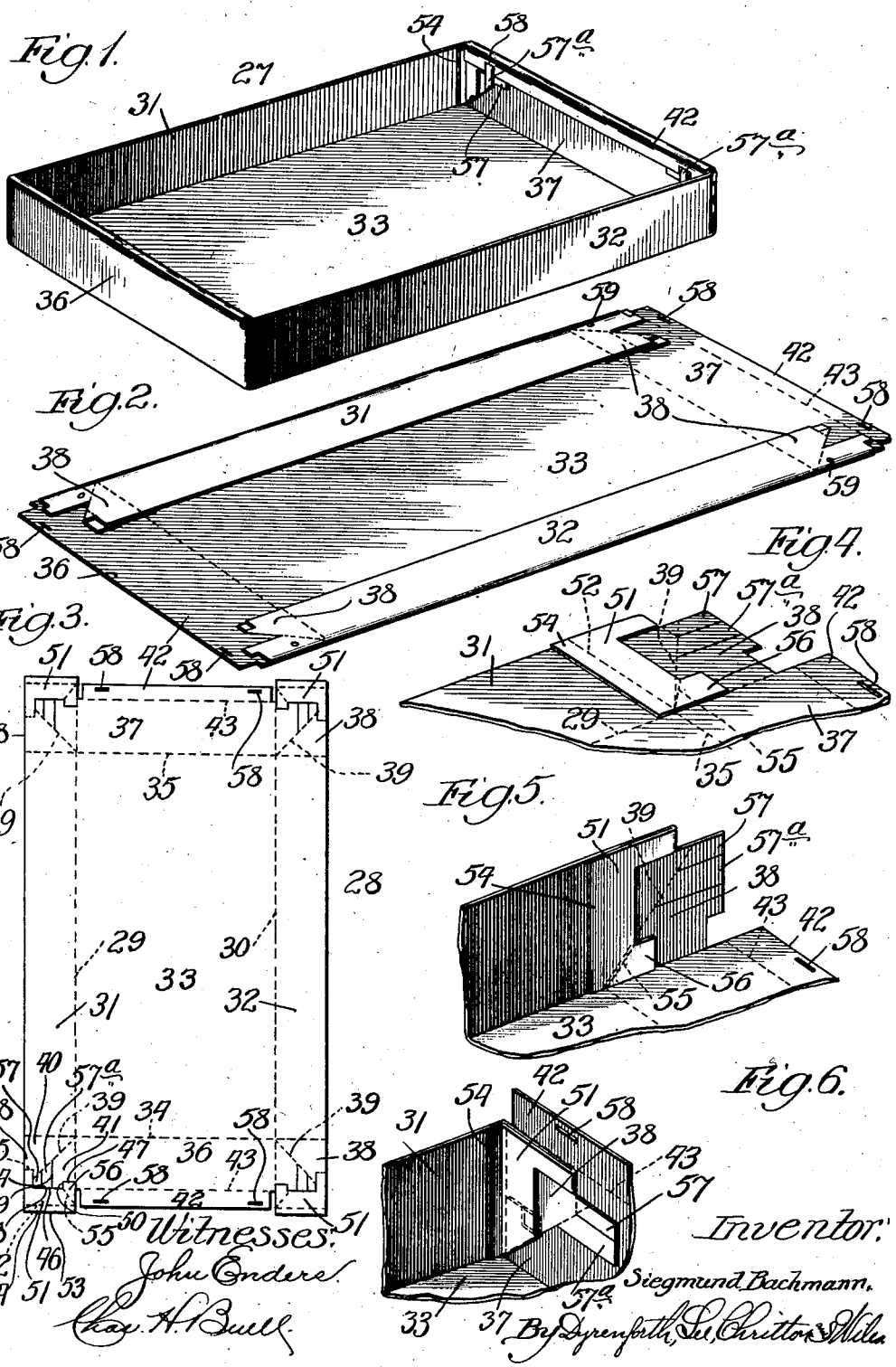

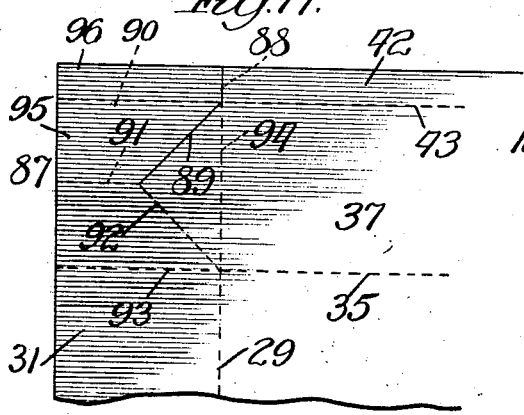
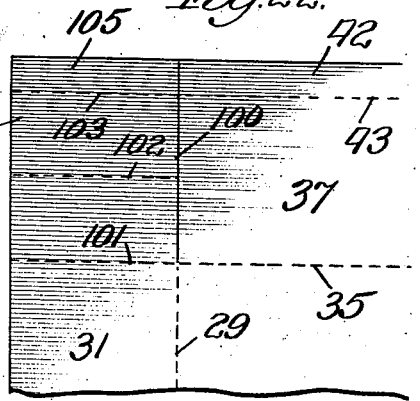
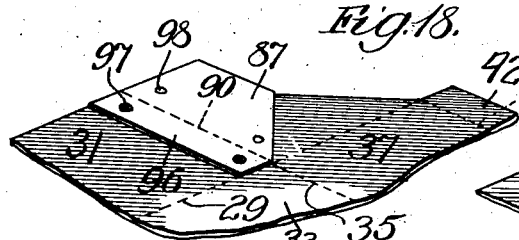
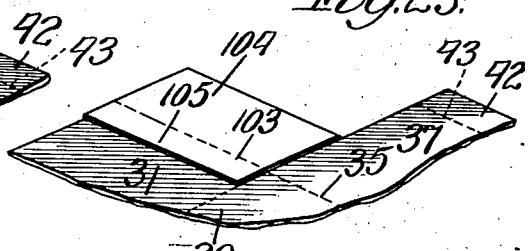
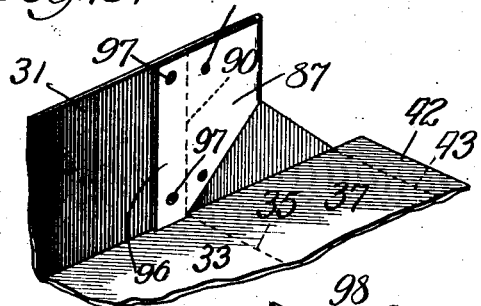
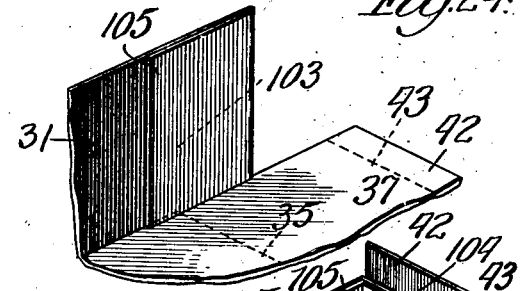
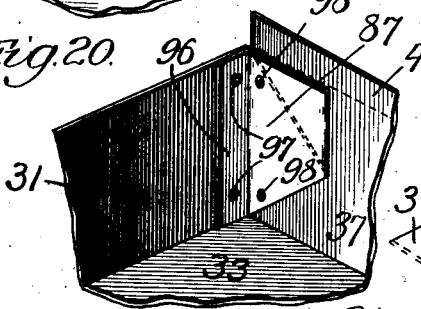
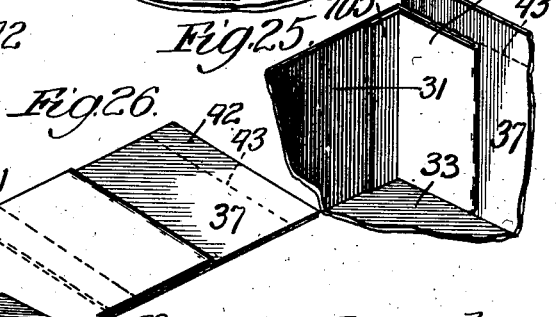
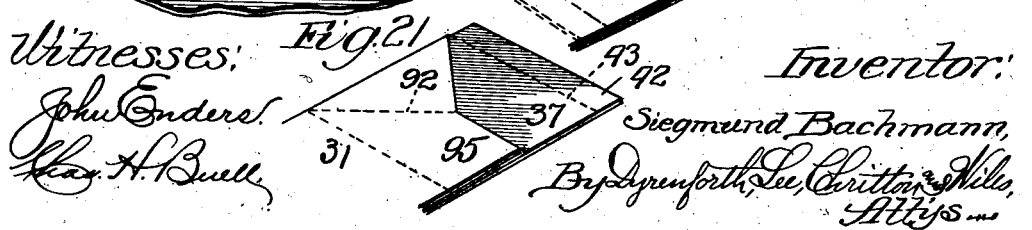

UNITED STATES PATENT OFFICE.

SIEGMUND BACHMANN, OF CHICAGO, ILLINOIS.

BOX.

No. 931,373.  Specification of Letters Patent.  Patented Aug. 17, 1909.

Application filed April 26, 1909. Serial No. 492,116.

*To all whom it may concern:*

Be it known that I, SIEGMUND BACHMANN, a citizen of the United States, residing at Chicago, in the county of Cook and State of Illinois, have invented a new and useful Improvement in Boxes, of which the following is a specification.

My invention relates, more particularly, to improvements in boxes formed from sheets of paper-box board, or other suitable material, involving in their manufacture the making of a blank of a desired form and bending such blank along folding lines to produce the box.
My primary objects are to provide for the reinforcing of the corners of boxes of the variety above referred to and to form such reinforcement from the corners of the blank.

Another important object is to form the reinforcements as above stated and to provide locking means preferably automatic in operation and in the form of lips, or tongues, for maintaining the reinforcements for the box-corners in position.
Referring to the accompanying drawings in which I have illustrated my invention as embodied in a plurality of forms of construction—Figure 1 is a perspective view of a foldable paper-board box illustrating a construction thereof embodying the preferred form of my invention. Fig. 2 is a view of the same showing the box in collapsed condition. Fig. 3 is a plan view of the blank from which the box illustrated in the preceding figures is formed. Fig. 4 is a broken perspective view, diagrammatic in its nature, showing a corner-portion of the box-blank in the condition of its representation in Fig. 3, but with a portion of its corner-extension folded back upon itself and against an adjacent wall-portion of the blank. Fig. 5 is a view of the same showing the wall-portion of the blank upon which the corner-extension is folded in erect position at a right-angle to the base of the blank. Fig. 6 is a view of the same showing both walls erected with the corner-extension folded into position for forming a reinforced corner of the box, the views in Figs. 4, 5 and 6 illustrating the successive operations for folding the blank to produce one of the four similar corner-portions of the box and righting its walls. Fig. 7 is a broken plan view representing one of the four similarly constructed corners of the blank for another form of embodiment of my invention. Fig. 8 is a broken perspective view of the same showing a portion of the corner-extension folded back upon itself and against the adjacent wall-portion of the blank. Fig. 9 is a view like that of Fig. 8 showing one of the wall-portions of the blank with the corner-extension folded against it as illustrated in Fig. 1, in erect position at a right-angle to the base. Fig. 10 is a view similar to Fig. 9 showing both walls erected and the corner-extension folded to form a reinforced corner for the box. Fig. 11 is a similar view showing the box collapsed. Fig. 12 is a view like Fig. 7, representing a blank for another form of embodiment of my invention. Fig. 13 is a similar view of the same showing the corner-extension bent upon itself and against the wall-portion carrying it. Fig. 14 is a similar view showing the wall-portion against which the extension lies, folded at its connection with the base to lie against the latter. Fig. 15 is a similar view showing both of the walls righted and the corner-extension folded to form a reinforced corner for the box. Fig. 16 is a similar view showing the box collapsed. Fig. 17 is a plan view of one of four similar corner-portions of a blank for forming still another form of box embodying my invention. Fig. 18 is a perspective view of the same showing a portion of the corner-extension folded upon itself and against the adjacent wall-portion of the blank. Fig. 19 is a similar view showing the wall-portion upon which the corner-extension is folded as represented in Fig. 17, in erect position at a right-angle to the base-portion of the blank. Fig. 20 is a similar view showing both of the wall-portions represented in erect operative position and the corner-extension folded to form a reinforced corner for the box. Fig. 21 is a similar view showing the box collapsed. Fig. 22 is a plan view like Fig. 7 showing a form of blank from which a box of another form of embodiment of my invention may be produced. Fig. 23 is a broken perspective view of the blank shown in Fig. 22 with its corner-extension folded upon itself and against the wall-portion of the box carrying it. Fig. 24 is a similar view showing the wall carrying the corner-extension erected to extend at a right-angle to the base-portion of the blank. Fig. 25 is a similar view showing both walls erected and the corner-extension folded to produce a reinforced corner for the box, and Fig. 26, a similar view of the box in collapsed condition.

Each of the five constructions of box selected for illustrating a different embodiment of my invention is of the collapsible type involving, generally stated, a base having four walls hingedly connected with the base, with extensions carried on the ends of opposed walls adapted to be folded flatwise against the adjacent walls of the box and held in position against accidental displacement by flaps carried by the walls against which the extensions are folded.

Referring particularly to Figs. 1 to 6, inclusive, the box in its noncollapsed condition is represented at 27. The blank 28 from which this box is formed consists of an oblong, rectangular sheet of box-board, or the like material, adapted to be folded along the parallel dotted lines 29 and 30 to form the box-sides 31 and 32 hingedly connected with a base 33, and along the dotted lines 34 and 35 to form the box-ends or end-walls 36 and 37, the dotted lines being, by preference, creases to facilitate folding the parts. Each line 31 and 32 intersects the lines 34 and 35 to form the four rectangular corner-sections, or extensions of the side-walls, 38 of the blank, adapted to be folded inwardly along the outer extremities of the folding lines 29, 30, 34 and 35, and along diagonal lines 39, (also preferably creases) to form the triangular sections 40 and 41. On each end of the blank is a flap 42 reaching preferably from the plane of the folding line 29 to that of the folding line 30, each flap being adapted to be folded at a dotted line 43, as hereinafter described. The corner-extensions 38 are of oblong, rectangular shape, the diagonal folding line 39 of each extension preferably extending from the intersection of the lines 34 and 29, for forming the sides of the box at equal angles thereto, to a line of severance 44 paralleling the outer edges of the sides of the blank and terminating at a folding line 45 extending parallel with the edges of the ends of the blank. Each corner-extension is cut along lines 46 and 47 paralleling each other and the ends of the blank, and along the parallel lines 48, 49 and 50 the lines 48 and 49 extending from the line 46 intermediate its ends to the dotted line 39, and the line 50 connecting the adjacent ends of the lines 46 and 47. The main sections thus partially severed from the extensions 38, are indicated at 51 and each of these sections has a folding line 52 parallel with its free edge 53 affording a reinforcing flap 54, and a diagonal folding line 55 extending from the intersection of the lines 46 and 50 to the inner edge of the extension, the provision of the folding line 55 thus affording a lip or tongue 56 on each extension. By cutting the extensions 38 along the lines 44, 48 and 49, tongues 57 and 57ª are afforded, either or both of which are bendable along the lines 39.

To form the box 27 from the blank 33, the sections 51 of the extensions are folded upon the lines 45 to the position of the one shown in Fig. 4. The walls 31 and 32 with the sections 51 thus lying against them are then turned upon the folding lines 29 and 30 to upright position, as illustrated in Fig. 5, whereupon the end-walls 36 and 37 of the box are righted, and the extensions 38 folded upon the lines 39, 55, 34, 35, 29, 30 and 52 to cause the extensions 38 to extend inwardly and lie against the inner faces of the adjacent end-walls of the box, the lips 56 to lie between the sections 41 and the inner surfaces of these end-walls, the flaps 54 to lie against the side-walls 31 and 32 at the end-portions of the latter, and the tongues to lie against the end-walls of the box, all as represented in Fig. 6 of the parts forming the box-corner therein illustrated. The flaps 42 may then be folded inwardly along the folding lines 43 to overlap the extensions 38 for holding the latter in place, in which position these flaps in the construction illustrated are designed to be held in place by turning the tongues 57ª upward from their position represented in Fig. 6 along the dotted folding line 39 to extend at their free ends through slots 58 located in the end-portions of these flaps. The tongues 57 are designed to be secured to the end walls in the position illustrated in Figs. 1 and 6 in any suitable manner, as by pasting, the provision of the tongues 57 being of especial advantage in constructions having low walls, as they serve to resist any tendency of spreading of the walls while the box is in use. The box thus formed may be collapsed to the condition represented in Fig. 2 by first withdrawing the tongues 57ª from the slots 58 and then pressing the end-walls 36 and 37 outward and side-walls 31 and 32 inward, to cause them to assume the positions illustrated in Fig. 2. The box may be righted from its collapsed condition, by turning the end and side walls at hinged connection with the base to upright position, thereby causing the extensions 38 to fold along the lines 39 to the position illustrated in Fig. 6, and then fastening the flaps 42 in position against the extensions 38 by means of the tongues 57ª as described.

It will be understood that instead of forming the box from the blank by the successive operations illustrated in Figs. 4, 5 and 6, the blank, after the portions 51 of the extensions have been folded to the position represented of the one in Fig. 4, may be folded into the condition illustrated in Fig. 2 by merely folding the side walls inwardly toward the base to cause them and the sections 49 to lie against the base and the tongues 57 and 57ª folded along the lines 39, to lie against the end-walls of the box. The box, thus provided in collapsed condition, may be righted as hereinbefore described of the blank in its condition shown in Fig. 2. It will be noted that the sections 51 of the extensions 38 thus lie at their end-portions against the inner surfaces of the end-portions of the walls 31 and 32, as illustrated in Fig. 6, and serve to reinforce the corners of the box, the lips 56, by reason of folding between the sections 40 and the inner surfaces of the end-portions of the walls 36 and 37 of the box, affording locking means for holding the sections 51 in position at the box-corners, these locking means operating by the mere act of righting the blank to be locked automatically in place, it being understood that the lips 56 are maintained between the sections 40 and the inner surfaces of the end-walls of the box, both when the box is righted and when it is collapsed to the form shown in Fig. 2. In view of the fact that the lips 56 lie at all times against the face of the portions 41 of the extensions 38 they may be permanently secured thereto in any suitable way at desirable points as, for instance, those indicated at 59. The provision of locking-means operating as described for holding the flaps 54 in position for reinforcing the corners renders unnecessary in many forms of box, the use of separable fastening means, such as eyelets, tape, staples, or any other form of separable fastener, or adhesives.

Referring particularly to Figs. 7 to 11, inclusive, the construction of box therein illustrated differs from that presented by the preceding figures only in the formation of its corner-portions. The corner-sections, or extensions, 60 are formed by the intersecting of the lines 29 and 30 with the lines 34 and 35, each extension being severed along the full lines 61, 62 and 63, and foldable along the dotted lines 64, 65, 66 and 67 and those portions of the lines 29, 30, 34 and 35 which extend beyond their intersection with each other, the provision of the severing lines referred to and the dotted lines 66 defining sections 68 which are free to be folded upon the lines 66, and the provision of the folding line 67 defining sections 69 and 70, the location of the lines 61 to 66 inclusive affording lips 71 and 72 on the sections 68. Each section 68 carries at its outer end a flap 73 foldable along a line 74. A box may be formed from a blank thus provided by first folding the sections 68 on the dotted lines 66 to cause them to lie flatwise against the sections 69 and 70 and the end-portions of the adjacent walls 31 and 32 as represented of the one in Fig. 8. The side-walls 31 and 32 may then be turned at the folding lines 29 and 30 to cause them to extend at a right-angle to the base as represented in Fig. 9. The next operation is that of bending up the end-walls along the folding lines 34 and 35 to upright position relative to the base 33, and simultaneously therewith bending the extensions 60 along the folding lines 64, 65, 66, 67, 74, and the outer extremities of the lines 29, 30, 34 and 35 to cause the extension to lie flatwise against the inner surfaces of the end-walls, the lips 71 and 72 to lie between the sections 69 and the inner surfaces of these walls, and the flaps 73 to lie flatwise against the adjacent end-portions of the walls 31 and 32, as represented in Fig. 10. The flaps 42 may then be bent down to overlap the extensions 60 so positioned, and to be fastened in such position in any desirable manner. The box may be collapsed by pressing the end-walls outward and bending the side-walls inwardly to cause the box to assume, at each of its corner-portions, the condition of the one represented in Fig. 11. The box may be righted from its collapsed condition to upright condition by swinging the end and side walls of the box to upright position, thus causing the extensions to fold along the lines 64, 65, 66, 67, 67, 74 and the outer extremities of the lines 29, 30, 34 and 35 to the position represented in Fig. 10. It will be noted that the extensions 60 lying at the corner-portions of the box serve to reinforce the latter, and that the flaps 73 are held in operative position by the confinement of the tongues 71 and 72 between the extensions 60 and the end-walls of the box.

It is manifest that instead of righting the blank by successive operations illustrated in Figs. 8 to 10 inclusive, it may be folded to the position illustrated in Fig. 11 by first turning the sections 68 to the position of the one illustrated in Fig. 8 and thereupon folding the side-walls 31 and 32 on the lines 29 and 30 to cause them to lie against the base 33, as illustrated in Fig. 11. Righting of the collapsed box may be effected by swinging the end-walls inwardly and the side walls outwardly and causing the extensions to fold along the lines 64, 65, 66, 67 and those portions of the lines 29, 30, 34 and 35 which extend beyond their intersection with each other. In this construction, as in the construction represented in the preceding figures, a reinforcing flap is provided for the corner-portions of the box, and automatically operating means in the form of tongues are provided for holding these reinforcing means in operative position.

Referring particularly to Figs. 12 to 16 inclusive, the box therein shown represents another form of embodiment of my invention, which differs from the construction of the last-preceding figures only in the construction of its corners. The extensions 75 formed by the intersecting of the lines 29 and 30 with the lines 34 and 35, are entirely severed from the end-walls 36 and 37 along the full lines 76, 77 and 78 and are adapted to be folded along the dotted lines 79, 80, 81 and 82, the folding lines 80 thus defining sections 83 carrying flaps 84 foldable along the dotted lines 82, and the folding lines 81 defining tabs 85.

To form a box from the blank just described, the sections 83 are first folded against the walls 31 and 32, along the lines 80 as represented in Fig. 13 of the corner-portion therein illustrated. The side-walls 31 and 32 are then folded along the lines 29 and 30 to cause them to lie flatwise against the base 33, and the extensions 75 to lie flatwise against the end-walls 36 and 37, as represented in Fig. 14. It is preferred that the tabs 85 lying flatwise against the end-walls as illustrated be secured in such position by any suitable fastening medium, as for instance the eyelets represented at 86. The end and side walls may then be righted, thus causing the extensions 75 to fold upon the lines 79, 81 and 82 to the position represented in Fig. 15, in which the extensions lie flatwise against the end-walls and the tabs 85 are confined between the extensions 75 and the ends-walls of the box, thereby holding the reinforcing flaps 84 securely in position at the corners of the box. I prefer to provide means, such as the eyelets indicated at 86, for fastening the tabs 85 to the end-walls, though it will be understood that such means are not necessary as the tabs by righting the blank will be held between the extensions on which they are carried and the adjacent end-walls. After folding the blank to the position illustrated in Fig. 15 the flaps 42 may be turned down along the folding lines 43 to cause them to overlap the extensions, in which position they may be secured by any suitable means. The box is collapsed by pressing the end-walls outwardly and turning the side-walls down upon the base, the position the parts assume being that represented of one corner of the box in Fig. 16. The box may be righted to operative position by swinging the end and side walls upward to a position at which they extend at right angles to the base, the extensions 75 in this operation folding along the lines 79, 81 and 82, to cause the extensions to assume the position illustrated of the one in Fig. 15. It will be noted that the sections 83, when the box is righted, are so disposed at the corners of the box as to reinforce them and that the tabs 85 serve to hold such sections in position for reinforcing the corners of the box.

Referring to Figs. 17 to 21 inclusive, the construction therein shown differs from that represented in the preceding figures only in the construction of its corners. In this construction the corner-extensions 87 are formed by the intersecting of the lines 29 and 30 with the lines 34 and 35, these extensions being cut along the full lines 88 and 89 and foldable along the lines 90, 91, 92, 93 and 94, thereby forming sections 95 carrying reinforcing flaps 96. The box is formed from the blank last described by first folding the sections 95 on the lines 91 to cause them to lie against the adjacent portions of the extensions 87 and the walls 31 and 32, as illustrated of the one in Fig. 18, and thereupon folding the walls 31 and 32 along the lines 29 and 30 to cause them to extend at right angles to the base 33 as represented in Fig. 19. The end-walls 36 and 37 may then be righted and simultaneously therewith the extensions 87 inwardly folded upon the lines 90, 92, 93 and 94 to cause them to lie against the end-walls 36 and 37 as represented in Fig. 20, whereupon the flaps 42 may be folded along the lines 43 to cause them to overlap the extensions 87 so folded, in which position the flaps may be secured in any suitable manner. The construction of the box now being described does not involve the use of automatic means for maintaining the reinforcing flaps in position for reinforcing the corners of the box, and to insure the proper positioning of the flaps 96, I prefer to secure them to the adjacent end-portions of the walls 31 and 32 in any suitable way, as by the eyelets indicated, or by any other suitable fastening medium, at the points indicated at 97 or 98, or both. The box thus righted from the blank shown in Fig. 17, may be collapsed as described of the box illustrated in Figs. 12 to 16 inclusive, the position occupied by the parts of the box when collapsed being that represented in Fig. 21 of those parts forming the corner-portion therein illustrated. It is manifest that this blank instead of being folded in accordance with the successive operations represented in Figs. 18 to 20 inclusive may be folded to the form illustrated in Fig. 21, preliminary to the righting of the box.

In the embodiment of my invention illustrated in Figs. 22 to 26 inclusive, the corner-extensions 99 are formed by the intersecting of the lines 29 and 30 with the lines 34 and 35, these extensions being severed from the end-walls 36 and 37 along the full lines 100 and foldable along parallel lines 101, 102 and 103, these dotted lines defining sections 104, each of which carries a reinforcing flap 105. The blank described may be folded to form a box by first folding the sections 104 upon the lines 102 to cause them to assume the position of the one represented in Fig. 23. The side-walls 31 and 32 may then be turned upward along the folding lines 29 and 30 to cause them to extend at right angles to the base 33, whereupon the end-walls 36 and 37 may be righted and simultaneously therewith the extensions 99 folded upon the lines 101 and 103 to cause the extensions to extend inwardly and lie against the end-walls and side-walls as represented in Fig. 25. The flaps 42 may then be folded along the lines 43 to cause them to lie flatwise against the extensions 99, in which position they may be secured in any suitable manner. The box may be collapsed by pressing the end-walls outward and folding the side-walls down upon the base and the extensions against the end-walls as illustrated in Fig. 26. To right this box from its collapsed condition, the side-walls are first raised to erect position, the extensions then folded inwardly along the lines 101 and 103 to the position represented in Fig. 25, and the end-walls then righted.

All of the forms of boxes represented by the drawings are of the type of collapsible box involving the use of flaps carried by opposed walls adapted to overlap the corner-extensions when the box is righted, which are readily transformable from collapsed to operative condition, and vice versa.

As clearly set forth in the foregoing description, the wall portions of the blanks forming boxes of each of the constructions illustrated may be folded from flat condition to upright condition, and the flaps 42 then folded over the extensions and fastened in place; or the blanks may be folded to form boxes in collapsed condition as represented of the various forms, from which collapsed condition the boxes are readily transformable to operative condition as hereinbefore set forth.

While I prefer to embody my invention in the types of boxes which are readily operative to reduce them to collapsed condition for shipment or storing, and readily restorable to operative condition for use, I do not wish to be understood as intending to limit my invention to its embodiment in boxes of these or similar types, as it may be embodied in any form of box employing corner-extensions located at the ends of adjacent walls of the box and adapted to lie against walls thereof. Furthermore, while boxes employing retaining flaps on opposite walls secured thereto in any suitable manner are of the type to which I prefer to apply my invention, it is readily apparent that such invention will have utility in constructions corresponding to all of those illustrated with the flaps 42 omitted. Such omission, however, would require the application to the extensions, after they and the walls had been righted and the box placed in non-collapsed condition, of means (not shown) for fastening the extensions to the walls against which they would lie, and these means might be of any suitable form.

The various forms of blanks illustrated in the drawings are designed for forming boxes of the type having their walls extending at right-angles to the base of the box. The corner-extensions of each of the blanks shown are thus shown of rectangular shape.

In making boxes of the type in which the walls incline with relation to the base, thus producing a flaring mouth-box, as is common with berry-boxes and receptacles for other material, to which class of boxes or receptacles my invention is applicable, the corner-extensions would vary in contour as compared with those of the blanks illustrated and would not be strictly rectangular in shape.

It will be noted that the principal feature of my invention consists of the provision of reinforcing means for the corners of a box formed from portions of the corner-extensions, and that another desirable feature consists in the provision of means which may operate automatically to insure the maintenance of the reinforcing portions of the extensions in position for reinforcing the corners of the box.

While I have illustrated a number of forms in which my invention may be embodied, I do not wish to be understood as limiting my invention to its embodiment in these particular forms, as various modifications of the constructions shown and described may be made without departing from the spirit of my invention. Furthermore, my invention is not limited to boxes in which the corner-extensions fold against the inner surfaces of walls of the box, it being applicable to boxes of the type in which such extensions overlap the outer surfaces of the walls.

What I claim as new, and desire to secure by Letters Patent, is:

1. A box comprising a base, walls extending upwardly therefrom, and corner-extensions connected with walls of the box and lying flatwise against adjacent box-walls, said extensions being formed with sections lying against the extensions and the adjacent walls of the box and forming reinforcements for the box-corners.

2. A box comprising a base, walls extending upwardly therefrom, corner-extensions connected with walls of the box and lying flatwise against adjacent box-walls, said extensions being formed with sections lying against the extensions and the adjacent walls of the box and forming reinforcements for the box-corners, and means for securing said sections in reinforcing position.

3. A box comprising a base, walls extending upwardly therefrom, corner-extensions connected with walls of the box and lying flatwise against adjacent box-walls, said extensions being formed with sections lying against the extensions and the adjacent walls of the box and forming reinforcements for the box-corners, and means carried by the extensions operating automatically to maintain said sections in reinforcing position.

4. A box comprising a base, walls extending upwardly therefrom, inwardly folded corner-extensions connected with walls of the box and lying flatwise against adjacent box-wall, said extensions being formed with sections lying against said extensions and the adjacent walls of the box and forming reinforcements for the box-corners, and tongues on said sections lying between the extensions and the walls adjacent thereto, for the purpose set forth.

5. A box comprising a base, walls extending upwardly therefrom, and inwardly folded extensions connected with walls of the box and lying flatwise against adjacent box-walls, said extensions being formed with sections lying against the extensions and the adjacent walls of the box and forming reinforcements for the box-corners.

6. A box comprising a base, walls extending upwardly therefrom, and corner-extensions connected with walls of the box and lying flatwise against adjacent box-walls, foldable inwardly along diagonal folding lines, said extensions being formed with sections lying against the extensions and the adjacent walls of the box and forming reinforcements for the box-corners.

7. A box comprising a base, walls extending upwardly therefrom, corner-extensions connected with walls of the box and lying flatwise against adjacent box-walls, folded along diagonal folding lines, said extensions being formed with sections lying against the extensions and the adjacent walls of the box and forming reinforcements for the box-corners, and means carried by said sections folded along diagonal lines and lying between said extensions and adjacent box-walls for maintaining said sections in reinforcing position.

8. A collapsible box comprising a base, surrounding walls hingedly connected thereto and carrying extensions adapted to extend inwardly and lie against adjacent walls, said extensions being formed with sections adapted to lie against the extensions and the adjacent walls of the box, with tongues on the sections foldable along folding lines and lying between the extensions and the adjacent walls for holding the sections in place for reinforcing the walls of the box.

9. A collapsible box comprising a base, surrounding walls hingedly connected thereto and carrying extensions connected with walls of the box lying flatwise against adjacent box-walls, said extensions being formed with sections lying against the extensions and the adjacent walls of the box, and forming reinforcements for the box-corners, and inwardly folded flaps carried by walls and overlapping said extensions.

10. A collapsible box comprising a base, surrounding walls hingedly connected thereto, and carrying extensions foldable along diagonal lines to adapt them to be folded inwardly to lie against adjacent walls, said extensions being formed with sections adapted to lie against the extensions and the adjacent walls of the box, means carried by said sections lying between the extensions and adjacent walls of the box when the box is righted and foldable along folding lines for maintaining said sections in reinforcing position, and inwardly foldable flaps carried by opposed walls and adapted to be folded over said extensions and be held in such position for the purpose set forth.

SIEGMUND BACHMANN.

In presence of—
R. HAROLD O'CONNOR,
JANE O'CONNOR.